United States Patent [19]

Syrjälä et al.

[11] 4,078,591
[45] Mar. 14, 1978

[54] APPARATUS FOR CHOPPING FOREST AND BOG STUMPS AND SNAGS IN FIELD

[75] Inventors: Urho Syrjälä; Olavi Orasvuo; Erkki Orasvuo, all of Hamina; Reijo Sakki, Summa, all of Finland

[73] Assignee: Kommandiittiyhtio Orasvuon Konepaja, Olavi Orasvuo Ja Kumppanit, Hamina, Finland

[21] Appl. No.: 689,781

[22] Filed: May 25, 1976

[30] Foreign Application Priority Data

May 26, 1975 Finland ................... 751513

[51] Int. Cl.² .............. A47J 49/02; B27L 7/00
[52] U.S. Cl. ............... 144/193 A; 100/98 R; 100/DIG. 5; 144/3 K; 144/193 R; 144/321
[58] Field of Search ........... 144/321, 309 R, 193 R, 144/193 A, 2 R, 3 K; 100/98 R, DIG. 5

[56] References Cited

U.S. PATENT DOCUMENTS

| 729,149 | 5/1903 | Fenn | 100/DIG. 5 |
| 1,666,795 | 4/1928 | Schmidt | 144/193 R |
| 3,872,785 | 3/1975 | Elliott | 100/98 R X |

Primary Examiner—Othell M. Simpson
Assistant Examiner—W. D. Bray
Attorney, Agent, or Firm—Haseltine, Lake & Waters

[57] ABSTRACT

Apparatus for use in economically profitable chopping of forest and bog stumps and of snags into transportable form in field conditions during all seasons. Chopping is effected by applying pressure which breaks the wood material charge that has been brought in one way or another into the space defined by a main blade and intermediate blades and by a backing plane and bottom. The stumps and snags in arbitrary positions are placed in such position with reference to the blades in connection with the pressing motion that the part of the wood material charge that has been cut off by the blades is able to evade the wedging pressure exerted by the sides of the blades, by sliding into a space which is more free, suffering rupture in the direction of the grain and being urged in chopped condition through the part constituted by the blades into the opening space.

7 Claims, 2 Drawing Figures

U.S. Patent  March 14, 1978  4,078,591
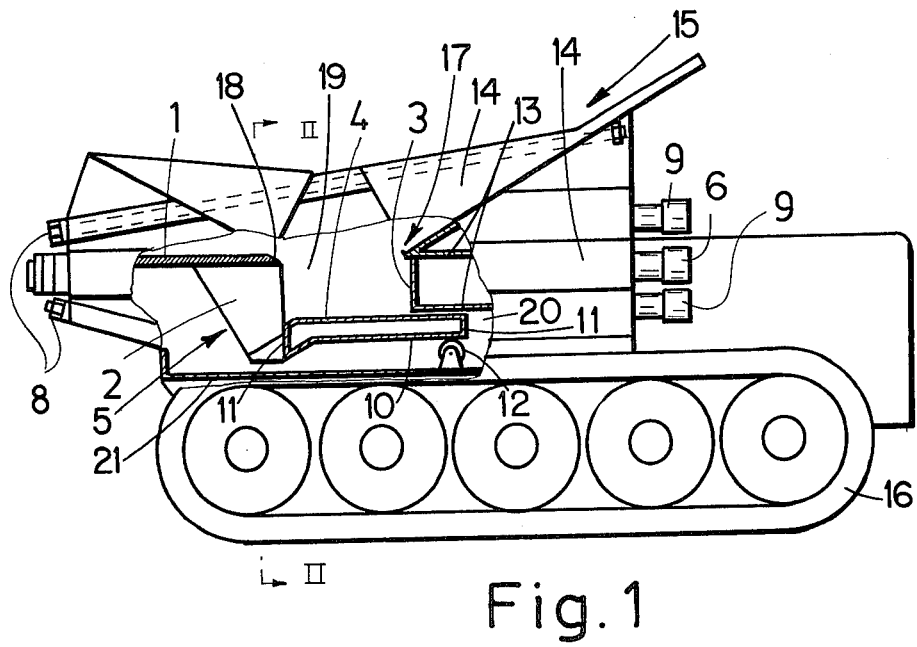
Fig. 1
Fig. 2
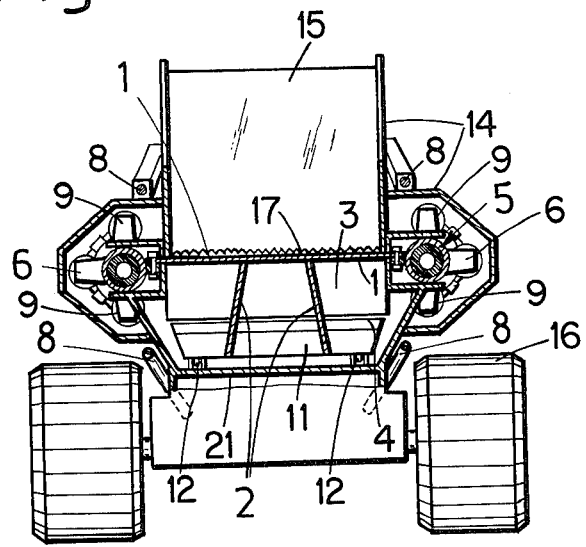

4,078,591

APPARATUS FOR CHOPPING FOREST AND BOG STUMPS AND SNAGS IN FIELD

FIELD OF THE INVENTION

The invention relates to apparatus for chopping forest and bog stumps and snags under field conditions so as to render the chopped wood suitable for transportation.

BACKGROUND

While in other respects the use of tree stumps and roots and of bog stumps and snags brought up from the bog by the peat industry, as raw material in the manufacturing of cellulose, has been developed so that it is fully applicable in practice, difficulties have been encountered in field conditions in finding an economically profitable and reliably operating method for the chopping of stumps and snags to such size that transportation might be economical with the common transport distance of wood raw material. For instance, in Finnish Pat. No. 47826 a stump lifting and crushing apparatus is known which has a capacity so low that the economical profitability remains insufficient. The apparatus is not suitable e.g. for chopping and loading for long distance transport of the stump and snag stores of peat bogs, at least not in an economically profitable manner.

SUMMARY OF THE INVENTION

An object of the present invention is to provide a stump chopping machine which is reliable in operation and has a sufficient capacity to enable continuous transport and which does not require any operating personnel to direct its operation.

Significant advantages of the apparatus of the invention compared with the known apparatus are the following. Continuous operation without manual control; charging may be continuous e.g. with the aid of a grab or a conveyor; in the charging operation the position of the stumps and snags in the chopping may be arbitrary; the forces required for the chopping are controllable also under winter conditions, whereby the apparatus is usable during all seasons and thereby continuous supply of choppings can be ensured; the chopped wood may be loaded with the aid of a conveyor directly on a switchable platform or trailer of a transport vehicle; in hydraulic operation using a variable output pump the inertia forces are completely controllable and overloading may be prevented by using a safety valve as a limiting means.

BRIEF DESCRIPTION OF THE DRAWING

The apparatus is described with regard to the operation of a stump chopping machine with reference to the attached drawings, wherein FIG. 1 is an elevation view of the stump cutting machine, partly broken away and in section, and FIG. 2 is a cross-section taken along the line II—II FIG. 1 with connecting beam of the blade crab guides and the protective covers removed.

DETAILED DESCRIPTION

In the machine shown in the drawing, which has been constructed as an embodiment of the invention, the functional components are: an installation 5 which moves back and forth and comprises a main blade 1 and two intermediate blades 2, a bottom 4 and two carriers 10 and beams 11 connecting these, this installation moving on revolving wheels 12 upon longitudinal guides of the carriers 10. The intermediate blades 2 extend downwardly from main blade 1 and are inclined with regard to one another as seen in FIG. 2 so that the space between the intermediate blades widens in a downwards direction. Further provided is a back wall 3 and a sheet box type frame 13 supporting the same and serving as a frame for the entire functional part of the machine. The frame 13 forms a cavity 20 therebelow with a bottom 21 of a stationary part of the machine. Attached to this frame are cylinder groups, comprising two cross tube cylinders 6 and four power cylinders 9. In addition, the revolving wheels 12 and four prestressed drawbars 8 have been attached to frame 13. Furthermore there are sheet box structures 14 affording protection of the moving parts, and these define a throat 15 into which the material is charged. In order to be transportable and movable, the machine is furnished with a track chassis frame 16, which also serves as a mounting for the power drive and pump unit and for a chopped wood loading conveyor (not shown).

The stump chopping machine is operated as follows. The drive motor or engine is started. A variable output pump (not shown) causes by means of liquid flow and by the piston rods of the power cylinders 9, reciprocating motion of the chopping installation 5. During the return motion the space between the wall 3 and the plane constituted by the edges of the blades 1 and 2 increases, whereby the charge falls through the throat to the depth delimited by the bottom 4. During the working stroke, the blades 1 and 2 press against the wall 3 via the part of the charge which is between the wall and the main blade 1 and lying on the bottom 4, the serration 17 on the upper edge of the wall 3 preventing the charge from gliding upwardly back into the throat. In the further course of the working stroke the charge is compacted between the blades and the back wall 3, and the blades cut from the charge a piece such as is confined by the throat, and the diminishing space forces the charge in chopped condition to pass through the space formed by the blades 1 and 2, into a receiving chamber formed by the free space which is created behind the blades 2 during the forward motion. During the return motion the chopped portion does not return into the space, which is created in front of the blades, but this opening space is instead filled with the following charge falling down from the throat, and the operation continues. The charging is continued by adding material to the throat accordingly as the chopping reduces the charge therefrom. In the present embodiment the charging is effected by a grab, but it may take place e.g. by means of a conveyor. These devices are not essential features of the invention and have not been shown. The chopped material is removed from the chopping space 19 by means of a conveyor, which may be assembled on the bottom 21 of said space 19.

The placement with reference to each other of the blades in the moving installation is such that the imagined continuations of the surfaces of the intermediate blades 2 constitute an opening angle of about 30°, which substantially diminishes or wholly eliminates the friction between the blade surface and the wood material, whereby the part of the charge that has been cut that is cut by the blades will to slide towards the free space behind the blades 2. In connection with the fiber-severing cutting, the snags will split and thereby avoid being wedged in a direction perpendicular to the fibers, against the blade surfaces. Owing to this movement the friction forces against the blade surfaces diminish. Any asymmetric loads occurring in connection with the cutting motion are equalized by means of the two piston cylinders 6 connected with cross tubing, and which with the aid of pressure fluid transfer the shearing force concentration to the cutting point, and no asymmetric loads will act on effecting frame structure. The forces producing torque which are created in the vertical plane between the blade 1 and the backing plane 3 are taken up by the prestressed drawbars 8, and hereby the effect of the forces is converted into pure tension, whereby in the structure the lightest possible design is achieved, while preserving full safety. By effecting one-sided sharpening 18 of the blade, the advantage is gained that the main blade 1 causes no wedging against the bottom 4, and the intermediate blades 2 cause no wedging between themselves. On the side of the blades' sharpening bead there is a free space in the machine and therefore no wedging can occur. The use of piston cylinders to produce the work and return strokes enables the forces that are generated to be limited by means of a relief valve for the system e.g. in the event of a stone being carried into the throat with a stump. A variable output pump can be used to control the deceleration and acceleration of the chopping installation as desired and thereby to delimit the inertia forces in the running of the machine.

What is claimed is:

1. An apparatus for chopping forest and bog stumps and snags under field conditions, said apparatus comprising a frame defining a chopping space within said frame, a generally vertical wall bounding one side of said chopping space and a cavity below said wall, chopping means reciprocably movable back and forth in said space in a direction perpendicular to said vertical wall, said chopping means comprising a generally horizontal main blade, at least two intermediate spaced blades extending downwardly from said main blade and inclined with regard to each other so that the space between the intermediate blades widens in a downwards direction, and a bottom member secured to said blades and extending mainly between said blades and said vertical wall when the chopping means is in a rearward position, said bottom member moving into said cavity below said vertical wall during forward motion of said chopping means, and means for supporting the chopping means and for effecting its reciprocating motion.

2. Apparatus as claimed in claim 1 comprising inlet means for feeding material to be chopped into said chopping space by gravitational deposit.

3. Apparatus as claimed in claim 2 including a serrated edge on said vertical wall extending into said chopping space and proximate said inlet means to prevent reverse flow of material to the inlet means during forward travel of the chopping means.

4. Apparatus as claimed in claim 1 wherein said frame has a receiving chamber behind said intermediate blades and below the level of said main blade.

5. Apparatus as claimed in claim 1 wherein said means supporting the chopping means comprises rollers.

6. Apparatus as claimed in claim 1 wherein said main blade has an upper beveled edge.

7. Apparatus as claimed in claim 1 comprising means supporting said frame for travel thereof.

* * * * *